United States Patent
Rahbar et al.

(10) Patent No.: US 12,450,342 B2
(45) Date of Patent: Oct. 21, 2025

(54) SECURITY SUBSYSTEM FOR EXECUTION VERIFICATION

(71) Applicant: Amazon Technologies, Inc., Seattle, WA (US)

(72) Inventors: Ali Rahbar, Bellevue, WA (US); Nhon Toai Quach, San Jose, CA (US); Samatha Gummalla, Dublin, CA (US); John Charles Wright, Oakland, CA (US); Jonathan Kang, Fremont, CA (US); Utpal Vijaysinh Solanki, Folsom, CA (US); Gururaj Ananthateerta, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 17/852,073

(22) Filed: Jun. 28, 2022

(65) Prior Publication Data
US 2023/0418936 A1    Dec. 28, 2023

(51) Int. Cl.
*G06F 21/55*    (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | |
|---|---|---|---|
| 11,573,923 B2 | 2/2023 | Anthony et al. | |
| 2011/0154059 A1 | 6/2011 | Durham et al. | |
| 2019/0034340 A1* | 1/2019 | Doshi | G06F 13/1668 |
| 2020/0026519 A1* | 1/2020 | Sultana | G06F 9/30058 |
| 2021/0089685 A1* | 3/2021 | Cheruvu | G06F 21/54 |
| 2021/0286761 A1 | 9/2021 | Anthony et al. | |
| 2023/0418985 A1* | 12/2023 | Rahbar | G06F 21/602 |

OTHER PUBLICATIONS

NXP, "Security Subsystems for Systems-on-Chip (SoCs) Common concepts and usage paradigms of security subsystems", 2020, 16 pages (Year: 2020).*

(Continued)

*Primary Examiner* — Han Yang
(74) *Attorney, Agent, or Firm* — Kilpatrick Townsend & Stockton LLP

(57) ABSTRACT

Techniques for providing execution verification at an integrated circuit device are described. The integrated circuit device may include a processor core configured to execute instructions. The integrated circuit device may also include a trace block configured to extract an execution trace from the processor core, the execution trace indicating the instructions that have been executed by the processor core. The integrated circuit device may further include a verification core configured to receive the execution trace from the trace block, extract an address from a control transfer instruction in the execution trace, perform one or more checks on the address, and generate an alarm signal based on the one or more checks.

18 Claims, 12 Drawing Sheets

(56) References Cited

OTHER PUBLICATIONS

Ammar et al., "Verify&Revive: Secure Detection and Recovery of Compromised Low-end Embedded Devices", The 4th International Conference on Computers in Management and Business, Dec. 7, 2020, pp. 717-732.
De Oliveira Nunes et al., "On the TOCTOU Problem in Remote Attestation," Proceedings of the 32nd Conference on L'interaction Homme-machine, Nov. 2021, pp. 2921-2936.
Dessouky et al., "Chase: A Configurable Hardware-Assisted Security Extension for Real-Time Systems," Institute of Electrical and Electronics Engineers/ACM International Conference on Computer-Aided Design (ICCAD), Nov. 4, 2019, pp. 1-8.
Feng et al., "Fast CFI: Real-Time Control Flow Integrity Using FPGA Without Code Instrumentation," Topics in Cryptology—CT-RSA 2020: The Cryptographers' Track at the RSA Conference, Dec. 31, 2019, pp. 221-238.
PCT/US2023/025979, "International Search Report and Written Opinion," Sep. 29, 2023, 11 pages.
Song et al., "HDFI: Hardware-Assisted Data-Flow Isolation," Institute of Electrical and Electronics Engineers Symposium on Security and Privacy (SP), May 22, 2016, pp. 1-17.
Spang et al., "DExIE—An IoT-Class Hardware Monitor for Real-Time Fine-Grained Control-Flow Integrity", Journal of Signal Processing Systems, vol. 94, No. 7, Jan. 6, 2022, pp. 739-752.
Rahbar et al., "Security Subsystem for Remote Attestation," U.S. Appl. No. 17/852,083, filed Jun. 28, 2022, 46 pgs.

\* cited by examiner

SECURITY SUBSYSTEM FOR EXECUTION VERIFICATION

BACKGROUND

An integrated circuit device may include various processing and memory elements such as a central processing unit (CPU), a domain specific accelerator (e.g., a neural network accelerator, a digital signal processor, etc.), volatile and non-volatile semiconductor memory, among other possibilities. Such elements may allow the integrated circuit device to perform various computing tasks, such as processing and storing data. An example of an integrated circuit device is a system on a chip (SoC), which typically integrates several computer components onto a single integrated circuit.

In some cases, an integrated circuit device such as an SoC can include a security module to protect the device against security threats. The security module may be incorporated into the SoC's CPU or may be a stand-alone module. In some instances, the security module can implement a hardware root of trust, which is generally characterized as a region in the device's hardware that provides a trusted execution environment (TEE) where only certain software can run, and further provides for certain cryptographic functions, such as the management of cryptographic keys. Implementing a root of trust in hardware is advantageous as malware cannot tamper with the functions it provides. Despite the progress made in SoC hardware security, certain device vulnerabilities continue to present challenges for hardware and software designers.

BRIEF DESCRIPTION OF THE DRAWINGS

Various embodiments in accordance with the present disclosure will be described with reference to the drawings, in which.

DETAILED DESCRIPTION

Figure 1:
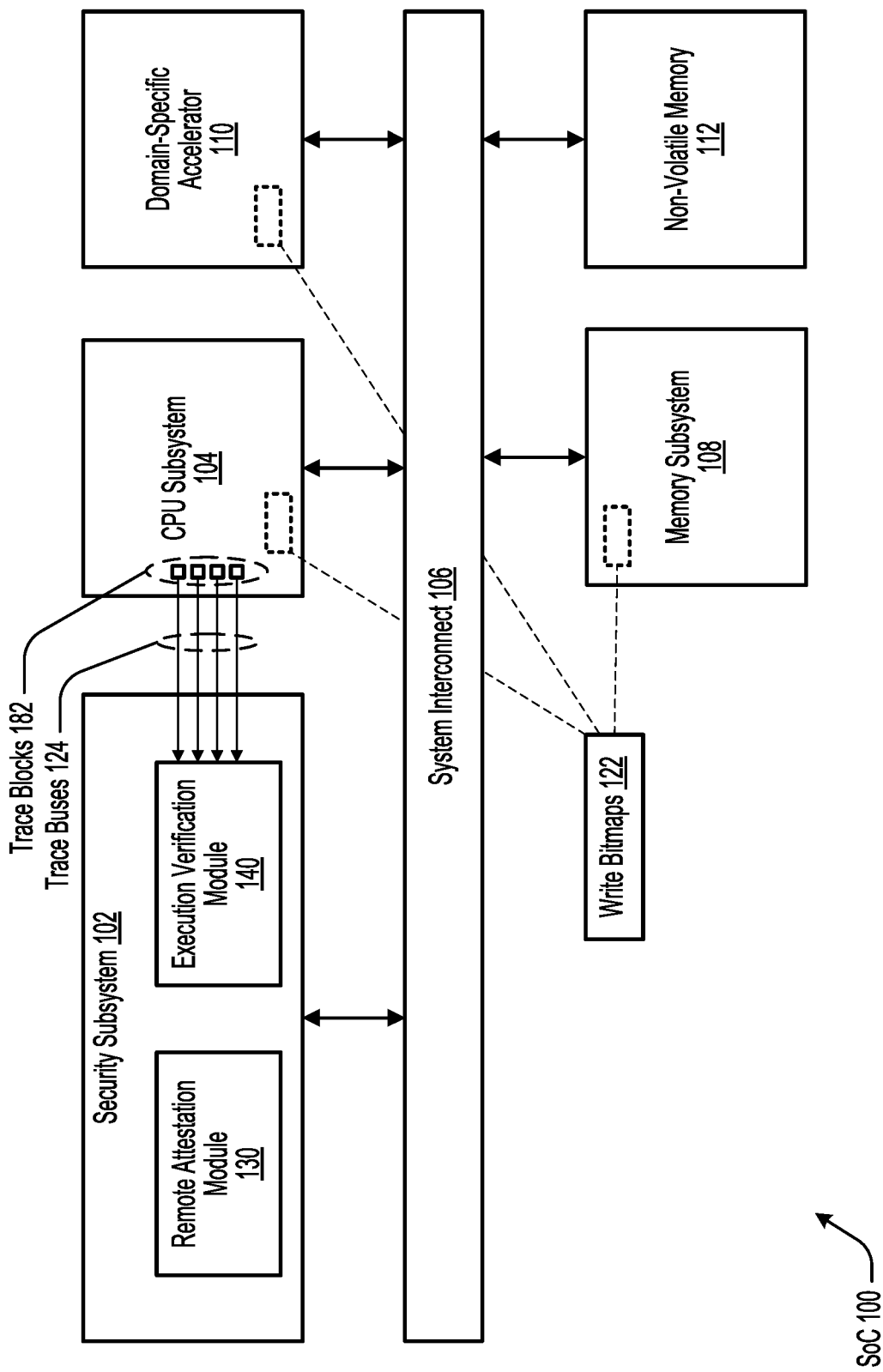
FIG. 1 illustrates an example of a system on a chip (SoC) that incorporates a security subsystem.

An integrated circuit device such as a system on a chip (SoC) can have different software or hardware vulnerabilities that put users of the device at risk. In some instances, one of several types of attacks can compromise the functionality of the device. Such attacks may include software attacks in a trusted execution environment (TEE), fault injection attacks, side-channel attacks via the hardware root of trust, among others. In many instances, a single vulnerability can lead to unauthorized code being executed on the device, which can allow an attacker to have unbridled access to the data stored on the device, as well as the device's full functionality.

In some cases, an attacker can break the secure boot at the boot ROM level using a fault injection attack or a software bug and compromises the chain of trust before a piece of external code even gets executed. The attacker can then interfere with the code starting from the first image loaded by the boot ROM. The attacker can modify data before it's loaded and disable any checks that are to be performed. As a result, there may not be any code on the device that can be trusted to perform any detection. In presence of cloud based verifications, the attacker can simply modify the code to properly provide answers to the queries and pass the checks, but then run unauthenticated code that compromises the security of the platform.

Embodiments of the present disclosure address these and other issues by providing a hardware-level security subsystem that can be integrated into a new or existing architecture of an integrated circuit device, such as an SoC. The security subsystem may be suitable for an integrated circuit device having any of a wide range of hardware, firmware, or software components. In some instances, embodiments may be integrated into SoCs to detect and prevent different types of attacks. Embodiments may include a security subsystem that provides a hardened hardware root of trust (RoT), an isolated execution environment, an execution verification engine, and/or a remote attestation engine, which allow the device to perform two main security sequences: remote memory attestation (or simply "remote attestation") and execution verification.

Remote attestation is a security mechanism that allows a trusted entity, referred to as the verifier, to measure one or more properties of an untrusted remote device, referred to as the prover. The properties measured by an attestation scheme depend on the conclusions that will be drawn from it. For example, an attestation scheme that aims to verify the authenticity of a device may only verify that the prover is in possession of a private key. Remote attestation is the building block of several security mechanisms such as proof of execution, proof of update, and control flow integrity verification. One goal of the attestation scheme described herein is to determine whether devices are running unauthorized critical software or not. To achieve this goal, the ability to authenticate the code present in different memory region of the device is important. This provides the ability to remotely query a device from an attestation server and detect any change in the code running on the device whether caused by the exploitation of a vulnerability or a fault injection attack. Attestation may be used to ensure that a device is healthy before performing sensitive operations such as Digital Rights Management (DRM) license acquisition or key provisioning.

In some instances, having the ability to detect whether the device is compromised can allow a remote server to refuse serving the device and revoke its credentials in order to contain the damage that the device can do. Execution verification analyzes the instructions executed by the device's central processing unit (CPU) cores to detect and respond to various software exploitation techniques, reduce the software attack surface, and verify the integrity of code execution to determine that the code is executed as intended.

Execution verification can be implemented in any SoC based on any instruction set architecture, including ARM, x86, etc., without modifying the CPU core.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of an SoC 100 that incorporates a security subsystem 102, in accordance with some embodiments of the present disclosure. The SoC 100 may alternatively be referred to herein (e.g., in the specification or in the claims) as an "integrated circuit device", an "integrated circuit, an "electronic circuit", a "circuit", a "computer system", an "electronic system", a "system", a "microarchitecture", among other possibilities. While the security subsystem 102 is shown in FIG. 1 as being a well-defined component within the SoC 100, in some instances the security subsystem 102 may be considered to include other hardware elements within the SoC 100 that facilitate and/or are used to implement the functionality of the security subsystem 102 but that are outside the physical boundary of the security subsystem 102, such as, for example, the write bitmap(s) 122 and the trace bus(es) 124, etc.

The SoC 100 may include a CPU subsystem 104, a domain-specific accelerator 110, a memory subsystem 108, non-volatile memory 112, and a system interconnect 106. In various examples, the system interconnect 106 may include one or more communication channels for allowing communication between the components of the SoC 100, such as one or more buses, meshes, matrices, fabrics, or a combination of these communication channels. For example, the system interconnect 106 may comprise a network on a chip (NoC) subsystem that allows the components of the SoC 100 to communicate by routing data using addressed packets. In some examples, the components of the SoC 100 may use an Advanced Extensible Interface (AXI) bus protocol to communicate via the system interconnect 106.

The CPU subsystem 104 may include a set of processors, processor cores, or CPU cores (with such terms being used interchangeably) that are capable of executing instructions. For example, each core may read and execute program instructions concurrently with the other cores, increasing speed for programs that are multi-threaded. The instructions executed by the processor cores may be stored on a computer-readable storage medium, for example, in the form of a computer program. Examples of processor cores that may be included in the CPU subsystem 104 may include processor cores that support different ISAs such as ARM, x86, or MIPs, developed by ARM®, MIPS®, AMD®, Intel®, Qualcomm®, and the like.

In some examples, the memory subsystem 108 may contain volatile memory. The memory subsystem 108 may, for example, include various types of random access memory (RAM) such as dynamic random-access memory (DRAM), static random-access memory (SRAM), double data rate synchronous dynamic random-access memory (DDR SDRAM), and the like. In some examples, the non-volatile memory 112 may include read only memory (ROM), Electrically Erasable Programmable Read-Only Memory (EEPROM), NOR/NAND flash memory, and/or some other suitable storage media. In some examples, the memory subsystem 108 may include some non-volatile memory. In some cases, some or all of the memory subsystem 108 and/or the non-volatile memory 112 may be internal to the SoC 100, while in other cases some or all of the memory subsystem 108 and/or the non-volatile memory 112 may be external to the SoC 100.

The domain-specific accelerator 110 may include one or more processors that are each optimized to perform computations for specific algorithms in a particular domain. The domain-specific accelerator 110 may include a neural network accelerator or processor, a digital signal processor, a graphics processing unit (GPU), a networking module (e.g., a WiFi module), and the like. The domain-specific accelerator 110 may include memory elements for storing data and instructions that are used by the domain-specific accelerator 110. For example, a neural network processor may include a first memory buffer for storing the input data of an inference operation, a second memory buffer for storing the weights associated with the inference operation, and a third memory buffer for storing the output data of the inference operation. These memory elements may be any suitable type of memory, such as SRAM.

The security subsystem 102 may include an execution verification module 140 and a remote attestation module 130, or multiple of each type of module. Using the execution verification module 140, the security subsystem 102 may perform an execution verification sequence (or simply "execution verification") continuously at runtime or in response to an external or internal event or request. During execution verification, the execution traces in the CPU cores in the CPU subsystem 104 are accessed via an Accelerator Coherency Port (ACP) at runtime or captured and sent across trace buses 124 to the execution verification module 140 (or to multiple execution verification modules), and analyzed to detect any deviation from the intended execution flow. In some examples, each CPU core may include a trace block 182 that captures the trace of the executed instructions, converts the execution trace to a compressed format, and sends the execution trace to the execution verification module 140 via one of a set of trace buses 124. In some examples, each of the trace blocks 182 may include an embedded trace macrocell (ETM) or another suitable component for extracting the executed instructions of the corresponding CPU core. In some examples, each of the trace buses 124 may utilize an Advanced Trace Bus (ATB) architecture.

The execution verification module 140 may decode the execution trace to extract the context ID, the execution privilege level, and the addresses for all control transfer instructions. In some examples, the execution verification module 140 may extract the virtual destination addresses for all branch instructions. In some instances, for execution verification to better perform the intended checks, the branch broadcast feature may be enabled in the CPU cores. In some examples, the execution verification module 140 may extract the return addresses associated with all function calls.

One of the checks performed by the execution verification module 140 may be a control flow analyzer check, which checks if the branch destination address falls within the approved address ranges. Other checks performed by the execution verification module 140 may include a functional pointer integrity check, a function call return address check, a control flow integrity check, and an execution signature check. In the functional pointer integrity check, the address is checked against a set of valid predetermined addresses or the valid return address of a function call in a simplified version. In the function call return address check, the return addresses of function calls are kept in a shadow stack. When the function call returns, the return address will be checked against those in the shadow stack. In the control flow integrity check, the signatures of the instructions in critical loops are computed and saved away. The signatures of these loops are computed during runtime and are compared against the stored away signatures. In some implementations, loop counts are also counted to ensure code integrity. In the execution signature check, the signatures of instructions and sources, destination, and iteration counts are calculated in the critical code sections and compared with a precomputed signature.

Remote attestation may be initiated by the security subsystem 102 or by a remote server that sends a challenge to the remote attestation proxy running, for example, in the host access port. The remote attestation proxy forwards the encrypted challenge to the RoT in the security subsystem 102. The RoT authenticates the challenge and, if successful, forwards it to the remote attestation module 130 for handling the attestation request. The remote attestation module 130 may handle the request and provide a return code with the last challenge based on the contents of the last modification challenge table (LMCT) and the write bitmaps 122. The remote attestation response may include the signature of the contents of the challenged address range along with the timestamp of the previous request and any memory writes since the last timestamp.

The RoT may compute an authenticated completion code (AIC) and the remote attestation proxy may return the AIC to the remote server. The remote attestation response will allow the server to detect any change of content in the challenged address range along with any unexpected writes which an attacker might perform to replace the memory with original content to pass the signature verification. If an unauthorized memory write or invalid signature is detected at one of the SoC's memories, the remote attestation server can take actions to limit the usability of this device. As an example, the remote server can stop any secure content delivery to this device.

Figure 2:
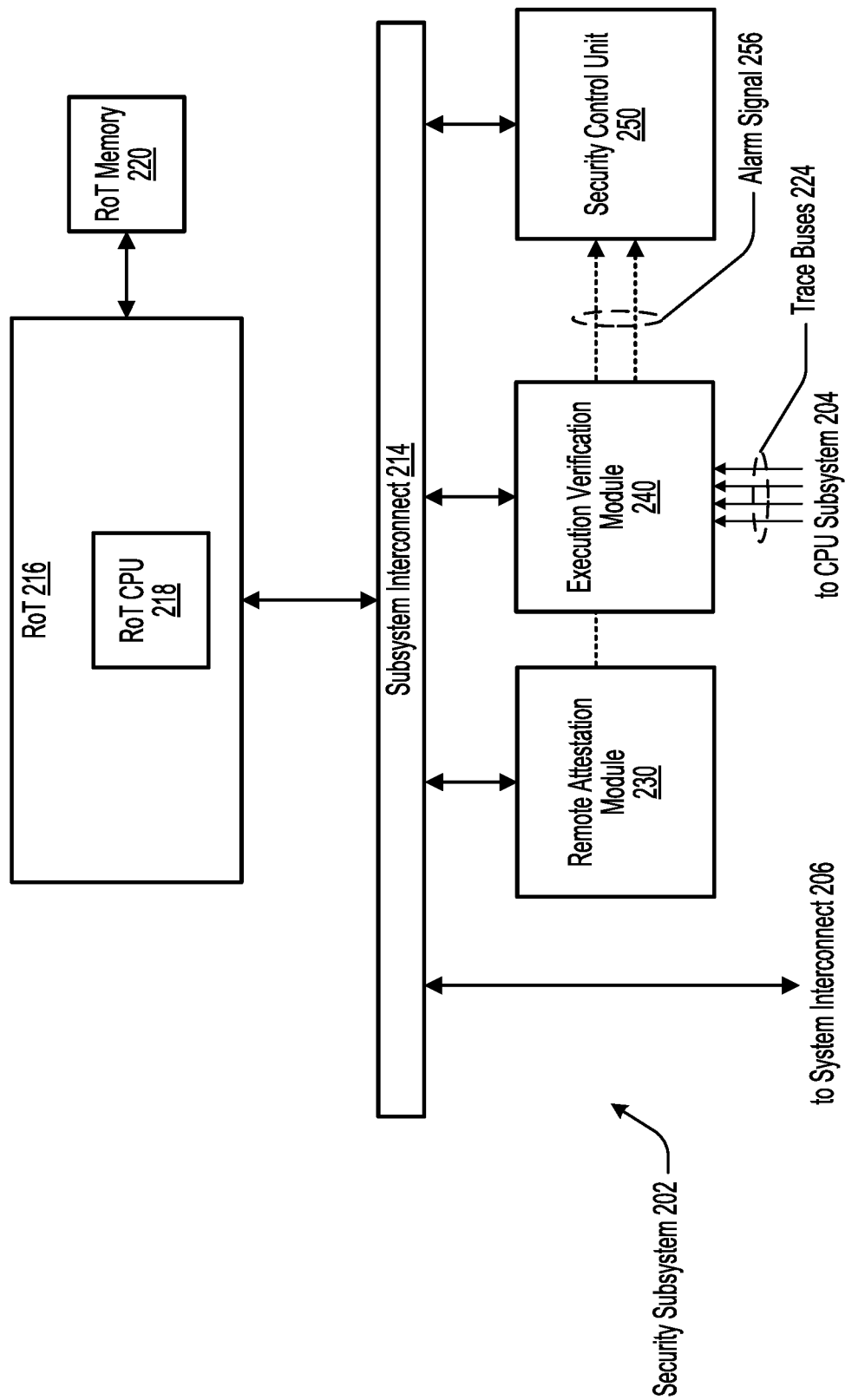
FIG. 2 illustrates an example of a security subsystem.

FIG. 2 illustrates an example of a security subsystem 202, in accordance with some embodiments of the present disclosure. The security subsystem 202 may include a RoT 216, a remote attestation module 230, an execution verification module 240, a security control unit 250, and a subsystem interconnect 214. The subsystem interconnect 214 may include one or more communication channels for allowing communication between the components of the security subsystem 202 (e.g., buses, meshes, matrices, fabrics, etc.) and further allows communication with a system interconnect 206. As described above, the execution verification module 240 and the remote attestation module 230 may facilitate a remote attestation sequence and an execution verification sequence, respectively.

As described above, execution verification may consist of inspecting the instructions that are executed by the processor cores in order to enforce policies on the control flow, detect attacks, and attest executed instructions and/or control flow transitions. Since most attacks will eventually cause an unexpected change of control flow or the execution of tampered instructions, the aim of execution verification is to detect attacks by verifying the control flow transitions and/or executed instructions. Execution verification is able to detect a wide range of attacks, including code reuse attacks, fault injections, and time of check time of use (TOCTOU). Advantageously, in many examples, execution verification doesn't require any modification to the CPU core.

In some examples, the execution verification module 240 obtains execution traces from the CPU cores. In some examples, a trace block (e.g., including an ETM) for each core produces an execution trace from that core. The trace is compressed, multiplexed with other trace sources, and routed through funnels and replicators to end up in trace sinks (e.g., buffer or port) based on the configuration of the components. In some examples, the compressed trace may only contain information about the execution of branch instructions that can affect the control flow. Any instructions between two branches may be assumed to be executed. The execution verification module 240 may retrieve the execution traces over the trace buses 224, the subsystem interconnect 214, and/or the system interconnect 206.

In some examples, the instruction traces may be analyzed to detect fault attacks, TOCTOUs, and attest the execution of instructions. It should be noted that an attacker who can overwrite or replace code, can create a malicious payload with the same control flow as the original code and pass all the control flow verifications. Since an execution trace contains the address of some instructions including the trace origin and branch targets, the execution verification module 240 can use those addresses to retrieve the executed instructions from memory. To get closer to what the CPU core has fetched and executed, the execution verification module 240 can retrieve memory content from the L2 cache (and the content can be retrieved from RAM in case of a cache miss). Since the L2 cache may be inclusive for instructions with regards to the L1 cache, reading instructions from the L2 cache is indicative of what the CPU care has read from the main memory.

Remote attestation is a security mechanism that can determine whether the SoC is running unauthorized critical software or not. To accomplish this, the remote attestation module 230 attempts to authenticate the code present in different memory regions of the SoC. This allows the SoC to be remotely queried from an attestation server to detect any change in the code running on the SoC, whether caused by the exploitation of a vulnerability or a fault injection attack. Remote attestation can be used to ensure that the SoC is healthy before performing sensitive operations such as a Digital Rights Management (DRM) license acquisition or key provisioning.

One way of preventing TOCTOU attacks is to verify whether target content has changed at an unexpected time. For example, it is not expected that the bootloader loaded in memory by the boot ROM is overwritten before execution or that some or all sensitive code in the TEE is overwritten after it is loaded and initialized. By providing some authenticated information about the time of the last modification of an address range as part of the attestation response, the remote attestation module 230 gives the requester the ability to check whether the address range was modified at an unexpected time. In order to do that, the remote attestation module 230 may keep track of all changes to the memory space and associate them to a point in time.

In some examples, the remote attestation module 230 may maintain a set of write bitmaps that track the change history of the memory content at certain granularities (e.g., 1, 2, or 4 kB blocks) in the memory space of the SoC. In some examples, the remote attestation module 230 may monitor all memory writes (e.g., CPU, DMA, and all masters) to the memory space. Each time a write to a block is detected, the remote attestation module 230 sets its corresponding bit in the write bitmap to 1. The write bitmap may record the write address of the detected memory write as well as the time stamp associated with the detected memory write.

In some examples, the remote attestation module 230 may maintain an associative list of attested address ranges and their corresponding attestation challenge called the last modification challenge. The remote attestation module 230 may authenticate each attestation request and extract the challenge and the address range from it. If any of the addresses in the address range has its bit set to 1 in the write bitmap, the remote attestation module 230 looks up the previous challenge corresponding to this address range in the last modification challenge associative list. If there is no challenge in the list or the current request's challenge value is greater than the previous challenge, the remote attestation module 230 updates the entry corresponding to this address range in the last modification challenge associative list with the current request's challenge and clears the corresponding bits in the write bitmap. If the challenge is less than the previous one, the attestation request is considered invalid and is discarded. The remote attestation module 230 may calculate the authenticated integrity code on the content of the address range with the current request's challenge and include the last modification challenge into the authenticated response.

In some examples, the security control unit 250 may function as the control unit of the security subsystem 202. One function of the security control unit 250 may be to receive alarm signals 256 from the remote attestation module 230 and the execution verification module 240. The alarm signals 256 may indicate that an attack was detected (or that a requested behavior was detected) by either the remote attestation sequence or the execution verification sequence. The security control unit 250 may handle the detected attack/behavior accordingly by, for example, notifying the requester of the remote attestation sequence or execution verification (e.g., the remote server) of the detected attack/behavior.

Another function of the security control unit 250 may be to accumulate all the errors from the remote attestation module 230, the execution verification module 240, the RoT 216, and the SoC, and to respond according to the chosen error policy. In some examples, the security control unit 250 may include an error accumulator that collects the errors from these components, compares the number of accumulated errors with the error policy, and performs an action based on the comparison. In some examples, the action may include determining that an attack has been detected and notifying the requester of the remote attestation sequence or execution verification of the detected attack. In one particular example, when the number of accumulated errors is greater than a threshold, the security control unit 250 may determine that an attack has been detected and take action to reset the SoC.

Figure 3:
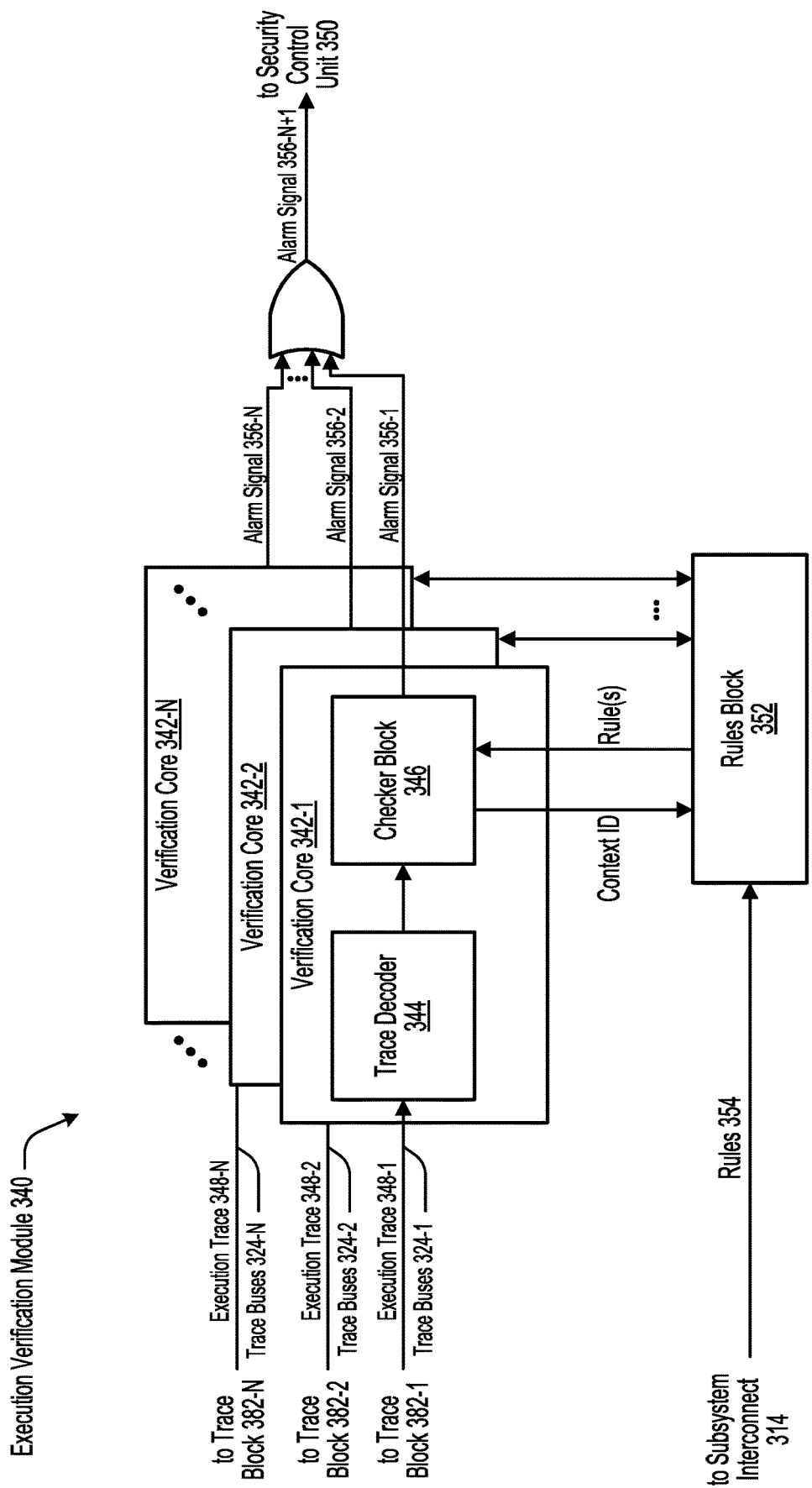
FIG. 3 illustrates an example of an execution verification module.

FIG. 3 illustrates an example of an execution verification module 340, in accordance with some embodiments of the present disclosure. The execution verification module 340 may include a set of N verification cores 342 that are each communicatively coupled to one of a set of N trace blocks 382. The trace blocks 382 may be physically located within the CPU subsystem and coupled to (or integrated with) the processor cores. In some examples, the verification cores 342 may be communicatively coupled to the trace blocks 382 via a set of N trace buses 324 that carry execution traces 348. In some examples, the verification cores 342 may receive the execution traces 348 via the subsystem interconnect 314 of the security subsystem.

Each of the verification cores 342 may include a trace decoder 344 and a checker block 346. The trace decoder 344 receives the corresponding execution trace 348, which may include compressed data. In some examples, each packet in the execution trace 348 may include a header byte that uniquely identifies the packet, and one or more payload bytes. The trace decoder 344 may be able to understand and handle each packet in the execution trace 348, even if it's just to discard the packet. In the event a packet of the execution trace 348 arrives that the trace decoder does not recognize, it will emit an unknown packet message to the checker block 346.

In some examples, the execution verification module 340 may include a rules block 352 that can store rules and their mapping to different context IDs. The rules block may receive a context ID as input from the checker block 346 and may output one or more rules from a set of rules 354 stored in the rules block 352. The checker block 346 can load the outputted rule(s) from the rules block 352 corresponding to the context ID and perform the execution verification checks on the addresses in the execution trace 348 based on the rule(s). The rules 354 may be loaded to the rules block 352 by the RoT via the subsystem interconnect 314.

In some examples, the trace decoder 344 identifies a control transfer instruction (e.g., a control flow instruction) in the execution trace 348-1, extracts an address (e.g., a destination address) from the control transfer instruction and the instruction's context ID, and outputs a message to the checker block 346 that includes the address of the control transfer instruction and the context ID of the instruction. Upon receiving the message, the checker block 346 may load rules corresponding to the context ID from the rules block 352. The checker block 346 may perform one or more checks on the execution trace 348-1 using the address and the loaded rules. In some instances, each of the loaded rules may correspond to a different check that is to be performed.

In some examples, the loaded rules include one or more acceptable or expected address ranges for the destination or return address, allowing the checker block to perform a control flow analyzer check. The checker block 346 performs the check by comparing the destination or return address to the acceptable address ranges, and the checker block 346 outputs an alarm signal 356-1 if the destination or return address does not fall into any of the acceptable address ranges (or if any other performed check is not passed). If N>1, the alarm signals 356-1 to 356-N are passed into an OR gate to produce an overall alarm signal 356-N+1, which is passed to a security control unit 350.

Figure 4:
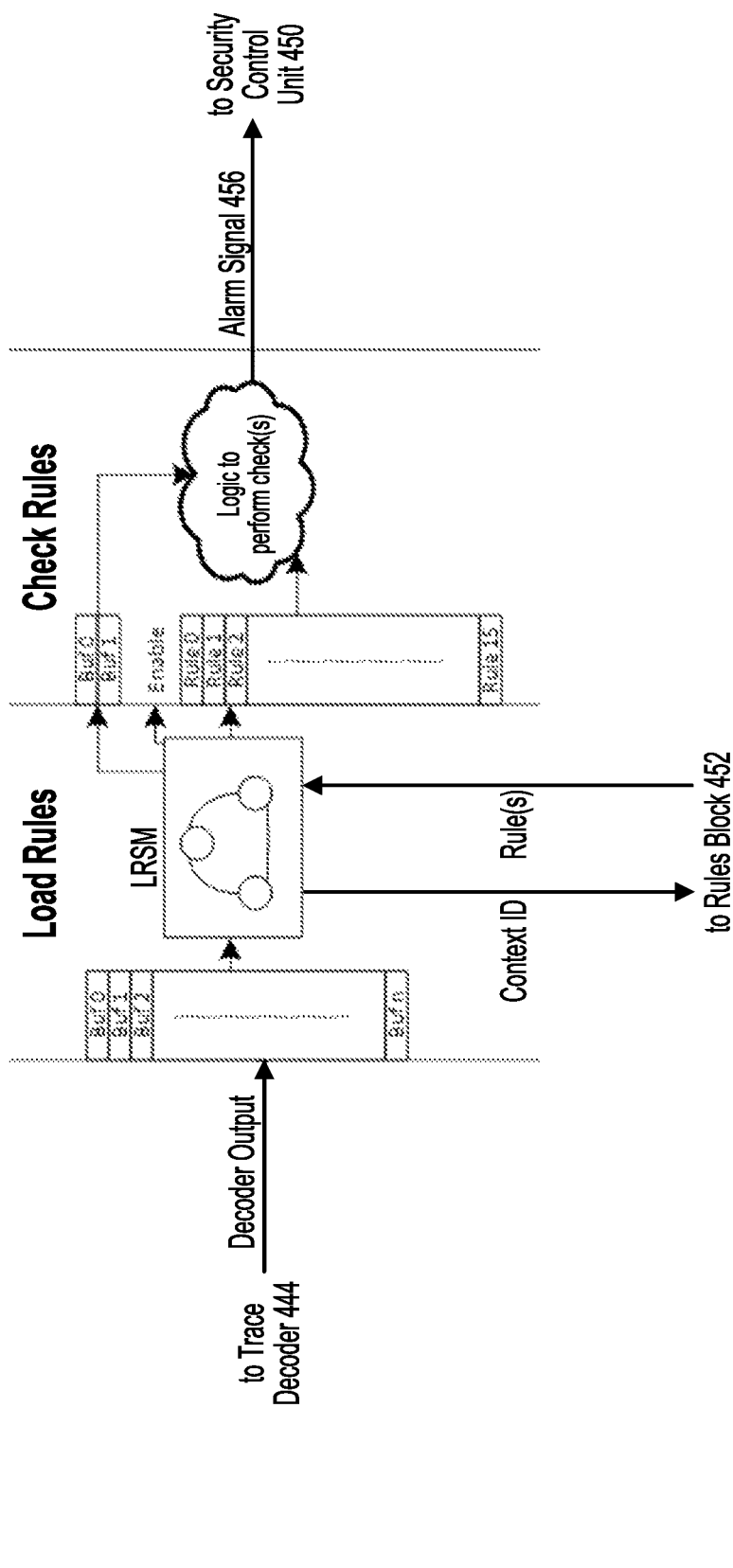
FIG. 4 illustrates an example of a checker block.

FIG. 4 illustrates an example of a checker block 446, in accordance with some embodiments of the present disclosure. The checker block 446 may look out for error conditions in the decoder output from the trace decoder 444 and produce an alarm signal 456 that is sent to the security control unit 450. In some examples, the checker block 446 may have a pipelined design with two stages: the load rules stage and the check rules stage. In the load rules stage, the trace decoder output is retrieved from a buffer. In some examples, a packet can be retrieved for each clock cycle. The decoder output (e.g., which may include a packet) from the trace decoder 444 may be stored into one of the buffer entries Buf 0-n as shown in the load rules stage.

Each decoder output may be processed by the load rules state machine (LRSM). For example, each decoder output may be checked to see if it includes a context ID. If it includes a context ID, the LRSM retrieves the rules from the SRAM in the rules block 452 and loads the rules into the rules registers Rule 0-15 as shown. The buffer may be sized to accommodate the maximum latency in reading the SRAM without any backpressure on the trace decoder 444 or the trace bus. If the context ID in the decoder output does not match with any rules in the rules block 452 or it is non-secure, then the check rules stage is disabled and the LRSM waits for next the decoder output.

Some of the decoder outputs may include an address packet. The payload in this packet, which may include a destination or return address, is forwarded to the buffer entries Buf 0-1 in the check rules stage and it is determined if the check rules stage is enabled. If check rules stage is not enabled, this packet is dropped. Otherwise, the check rules stage is performed with all rules loaded into the rules registers and the address packets loaded in buffer entries Buf 0-1. For all the addresses in these buffers, the logic performs one or more checks using the addresses. For example, in accordance with at least one of the checks, the logic may determine if the address in the address packet falls into any of the address ranges indicated in the loaded rules. If the address does not fall into any of the address ranges, an alarm condition is met and consequently an alarm signal 456 is generated and outputted to the security control unit 450.

Figure 5:
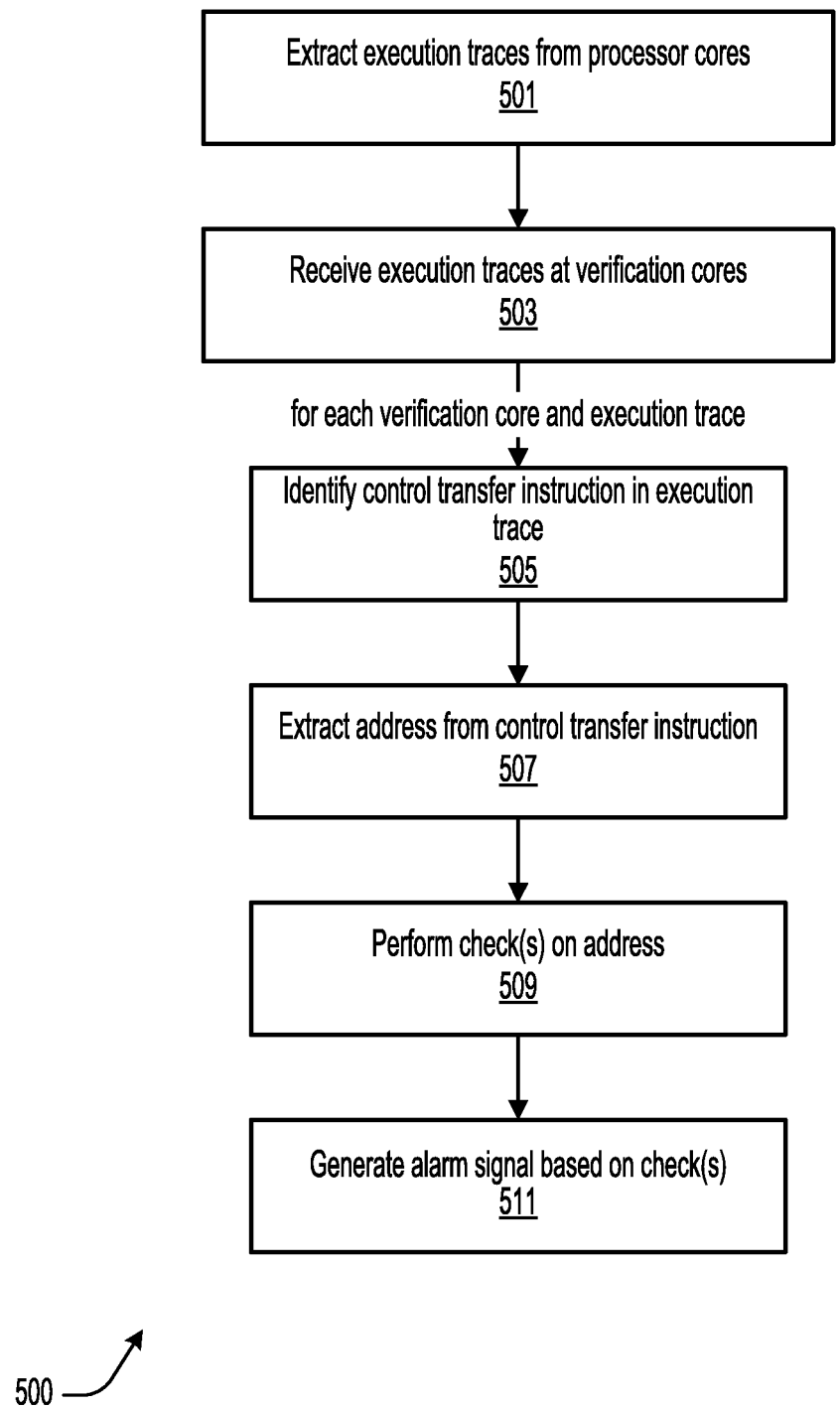
FIG. 5 illustrates a method of performing execution verification using a security subsystem of an integrated circuit device.

FIG. 5 illustrates a method 500 of performing execution verification using a security subsystem (e.g., security subsystems 102, 202, 802) of an integrated circuit device (e.g., SoCs 100, 200), in accordance with some embodiments of the present disclosure. The integrated circuit device may also include a CPU subsystem (e.g., CPU subsystems 104, 204, 804) that includes a set of processor cores, a set of trace blocks (e.g., trace blocks 182, 382) coupled to the set of processor cores, and a system interconnect (e.g., system interconnects 106, 206, 606, 706, 806). The security subsystem may include an execution verification module (e.g., execution verification modules 140, 240, 340) that includes a set of verification cores (e.g., verification cores 342). Each of the set of verification cores may include a trace decoder (e.g., trace decoders 344, 444) and a checker block (e.g., checker blocks 346, 446). The integrated circuit device may further include a set of trace buses (e.g., trace buses 124, 224, 324) that extend between the set of trace blocks and the set of verification cores.

At step 501, the set of trace blocks may extract a set of execution traces (e.g., execution traces 348) from the set of processor cores. In some examples, each of the set of trace blocks may extract a corresponding one of the set of execution traces from a corresponding one of the set of processor cores. The set of execution traces may indicate instructions that have executed by the set of processor cores.

At step 503, the set of execution traces may be received (e.g., accessed) at the set of verification cores. In some examples, each of the set of execution traces may be received at a corresponding one of the set of verification cores. The set of execution traces may be received via the set of trace buses. The set of trace buses may be separate from the system interconnect.

Each of steps 505 to 511 may be performed for each verification core of the set of verification cores. At step 505, the verification core may identify a control transfer instruction in the execution trace. The control transfer instruction may be a control flow instruction such as a branch instruction. In some examples, the control transfer instruction may include a conditional branch instruction, an unconditional branch instruction, a direct branch instruction, an indirect branch instruction, a function call instruction, or a function return instruction.

At step 507, the verification core may extract an address from the control transfer instruction. The address may be a destination address or a return address. In some examples, the verification core may extract a context ID from the control transfer instruction.

At step 509, the verification core may perform one or more checks on the address. The one or more checks may include a control flow analyzer check, a functional pointer integrity check, a function call return address check, a control flow integrity check, or an execution signature check. In some examples, to perform the one or more checks, the verification core may retrieve a rule from a rules block (e.g., rules blocks 352, 452) based on the control transfer instruction. In a control flow analyzer check, for example, the rule may include an acceptable address range. The rules block may store a set of rules (e.g., rules 354). In some examples, the verification core may retrieve the rule from the rules block based on the context ID. In some examples, the verification core may compare the address to the acceptable address range. The verification core may determine that the address is within the acceptable address range or that the address is not within the acceptable address range. If the address is a return address, the verification core may determine whether the return address corresponds to memory locations immediately after a function call. In some examples, the one or more checks may be performed on an instruction or a loop count from the execution trace.

At step 511, the verification core may generate an alarm signal (e.g., alarm signals 256, 356, 456) based on the one or more checks. The alarm signal may indicate that the address in the execution trace did not pass at least one of the one or more checks. For example, for the control flow analyzer check, the check is failed and the alarm signal is generated if the address is not within the acceptable address range. The alarm signal may be sent to a security control unit (e.g., security control units 250, 350, 450). The alarm signal may be used to notify a server that the address in the execution trace did not pass at least one of the one or more checks. In some examples, the alarm signal may indicate that an attack has been detected at the integrated circuit device. In some examples, the alarm signal may also include a time stamp associated with an execution of the control transfer instruction at the set of processor cores.

Steps of the method 500 may be performed in any order and/or in parallel, and one or more steps of the method 500 may be optionally performed. One or more steps of the method 500 may be performed by one or more processors. The method 500 may be implemented as a computer-readable medium or computer program product comprising instructions which, when the program is executed by one or more processors, cause the one or more processors to carry out the steps of the method 500.

Figure 6:
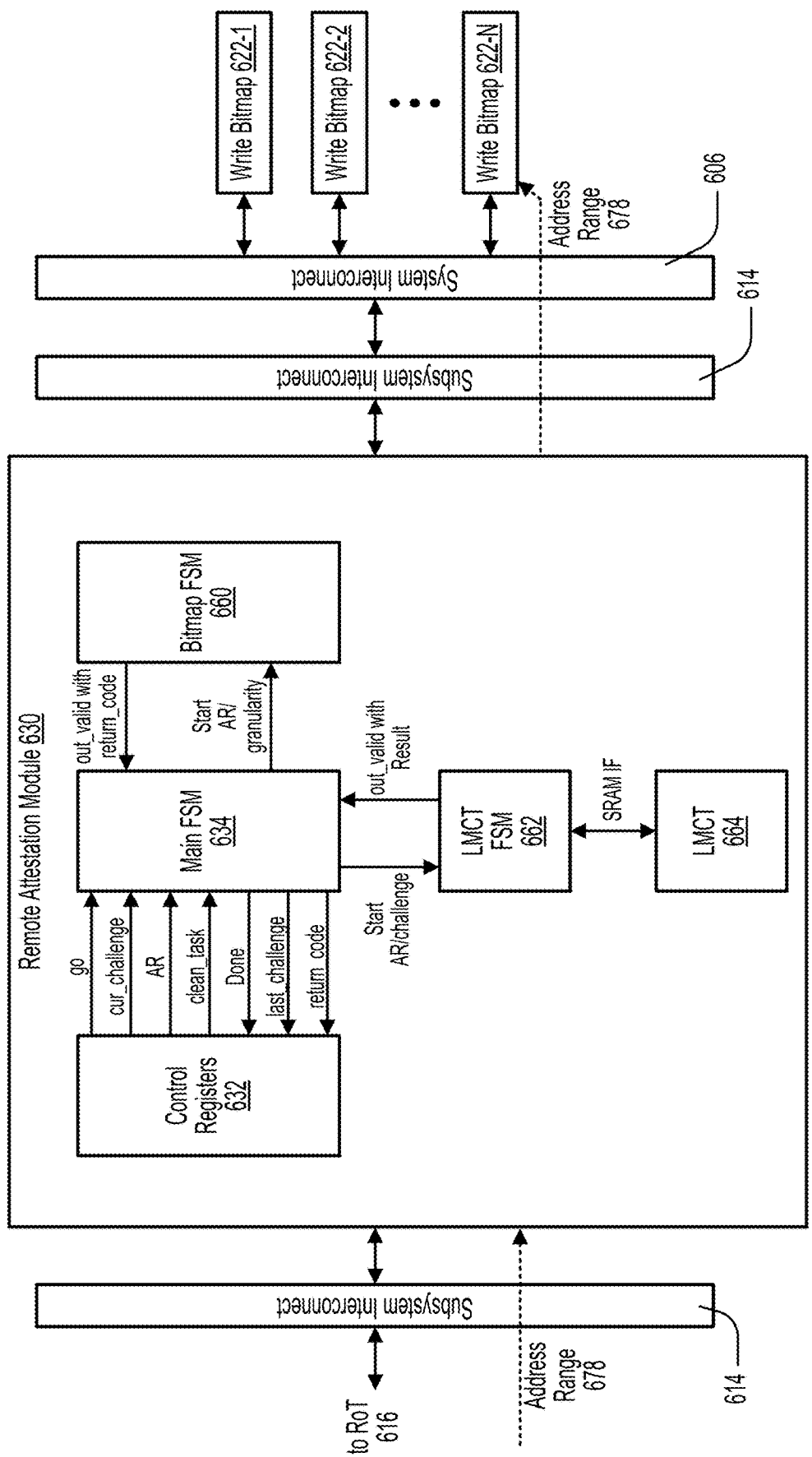
FIG. 6 illustrates an example of a remote attestation module.

FIG. 6 illustrates an example of a remote attestation module 630, in accordance with some embodiments of the present disclosure. The remote attestation module 630 may include control registers 632, a main finite-state machine (FSM) 634, an LMCT FSM 662, an LMCT 664, and a bitmap FSM 660. In some examples, the remote attestation module 630 is responsible for the following two operations. For the first operation, the remote attestation module 630 may respond with the last challenge and bitmap status of write bitmaps 622 when there is a challenge request from a RoT 616. A challenge request may consist of an address range (AR) 678 of interest and the current challenge. The remote attestation module 630 may check the bitmap status of the write bitmaps 622 and clear the bits of the write bitmaps 622 within the address range 678 of interest. The remote attestation module 630 may store the previous challenge in a data structure known as the LMCT 664 and update/check the content of the LMCT 664 based on the bitmap status. The update of the LMCT 664 occurs when the bitmap for the address range 678 is non-zero. In some examples, the LMCT 664 contains the challenge as well as the corresponding address range that the challenge came with.

For the second operation, the remote attestation module 630 may clear the entire write bitmaps 622 when the RoT 616 writes to the address monitor range (AMR) register. In some embodiments, the Rot 616 may ensure that only the first operation or the second operation is being performed at a given time. For example, after initiating the first operation with a challenge request, the RoT 616 may wait until the bitmap status of the write bitmaps 622 is received before initiating the second operation.

In some examples, the LMCT 664 is implemented as an SRAM containing a 2-tuple (AR, LC), where AR is the address range, and LC the Last Challenge. For each attestation, the LMCT FSM 662 may look up the incoming address range in the LMCT 664, one entry at a time, until it either finds the matching entry or reaches the end without finding one. In some examples, the LMCT 664 may be a circular buffer and that wraps around on overflow. In some examples, there may be two pointers in the LMCT FSM 662: a write pointer for storing the new address range and a search pointer for searching for an address. The write pointer can be used to define and narrow the search range, as only the entries in the LMCT 664 that have been written to need be searched.

The bitmap FSM 660 may perform checking and cleaning tasks. For checking, the bitmap FSM 660 may read one or more of the write bitmaps 622 based on the address range 678 and then write zeros back to the write bitmap 622. The bitmap FSM 660 may keep track and update the register bitmap value from the bitmap read data. The register bitmap value may be cumulative based on all the prior reads to the bitmap. For all data writing to the write bitmaps 622, the bitmap FSM 660 will first send the write data mask, wait for the write response, and then send the write data for the address.

Figure 7:
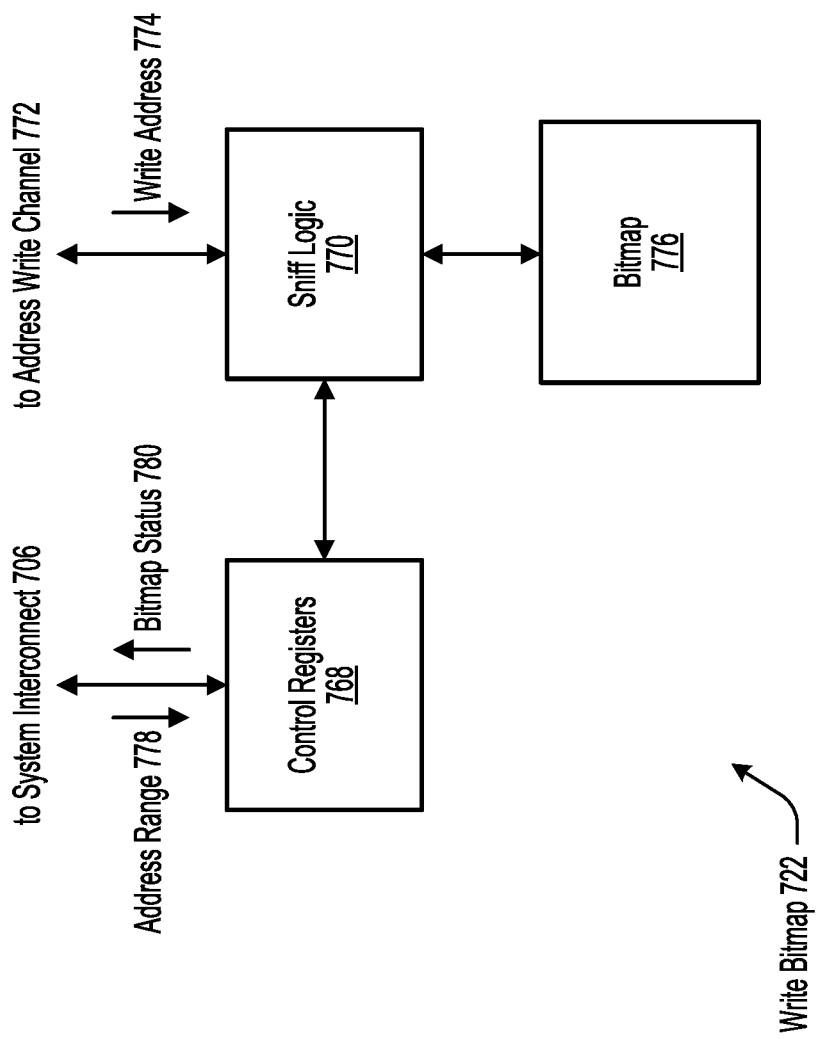
FIG. 7 illustrates an example of a write bitmap.

FIG. 7 illustrates an example of a write bitmap 722, in accordance with some embodiments of the present disclosure. The write bitmap 722 may include control registers 768, sniff logic 770, and a bitmap 776, which may be implemented by SRAM. The write bitmap 722 may reside outside of the physical boundary of the security subsystem and may need to be instantiated in the SoC. The sniff logic 770 may extract a write address 774 in an address write channel 772. In some examples, the address write channel 772 may be the AXI address write channel from the DDR Memory Controller (DMC) or on-chip SRAM. The sniff logic 770 may then compute the appropriate bit to update in the bitmap 776. Since the size and structure of the write address 774 can vary, the sniff logic 770 may need to convert that information to the actual bitmap update.

The bitmap 776 may track all write history on a particular granularity, e.g., 1 kB. To cover an address range of 64 MB at a granularity of 1 kB granularity, for example, the size of the SRAM may be 64 kb or 8 kB. At a granularity of 512 B, the same 8 kB SRAM can only cover 32 MB of address range. The remote attestation module may control the granularity using the control registers 768. In some examples, the sniff logic 770 monitors information in the address write channel 772, detects the write address 774 based on the information, and updates the corresponding bit value in the bitmap to 1 based on the monitor range in the control registers 768 and the SRAM physical size. In some examples, the bitmap 776 may support a bit level write mask.

In some examples, in order to support continuous AXI requests (e.g., 64 outstanding bursts for DDR memory), pipeline logic may be needed to perform one AXI address write request per clock cycle. In some examples, a buffer is used between the address write channel 772 and the sniff logic 770, and the depth may be the number of cycles required to finish one AXI AW request update to SRAM/ flops.

Figure 8:
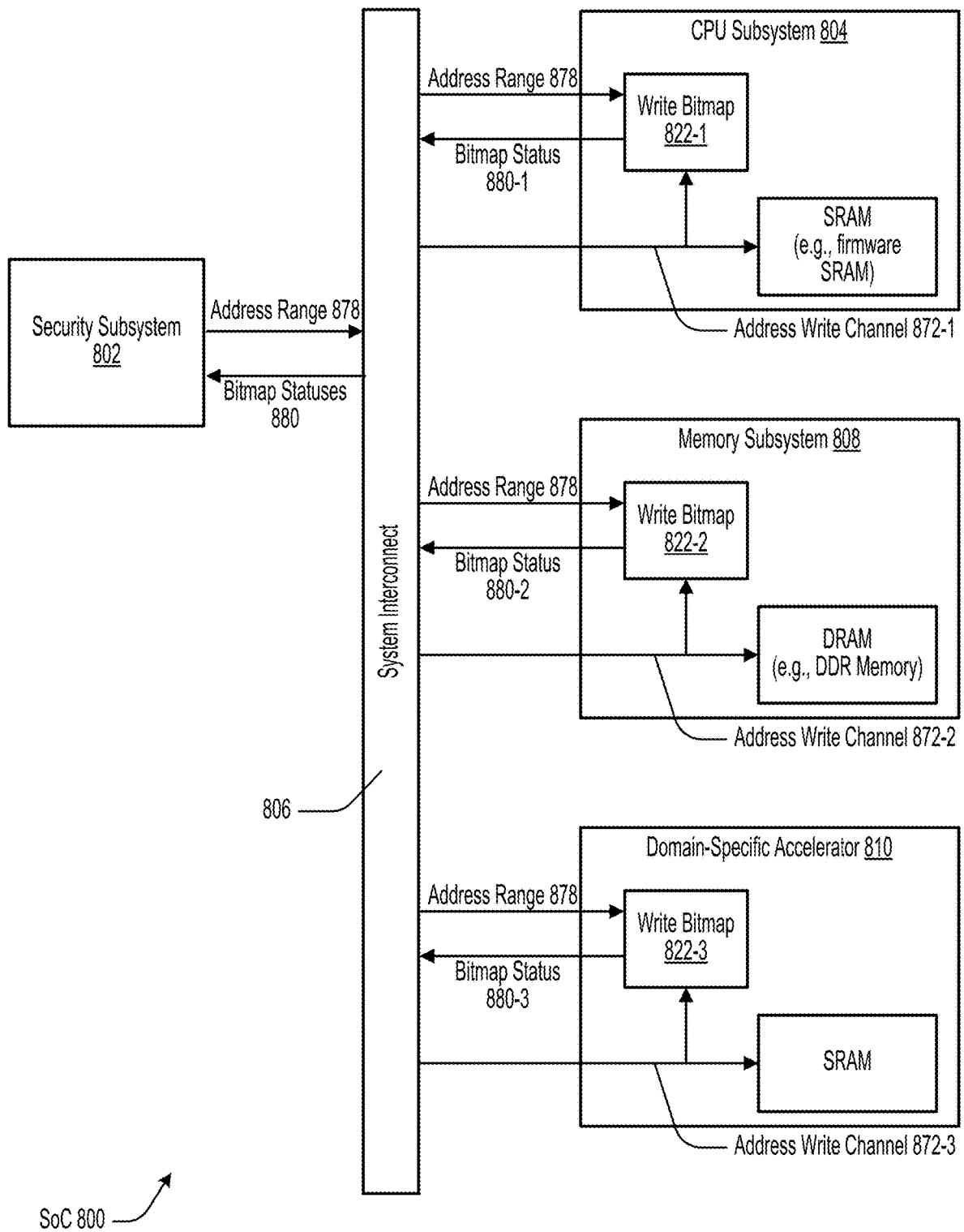
FIG. 8 illustrates example components of an SoC that may be involved during remote attestation.

FIG. 8 illustrates example components of an SoC 800 that may be involved during remote attestation, in accordance with some embodiments of the present disclosure. The SoC 800 may include a security subsystem 802, a system interconnect 806, a CPU subsystem 804, a memory subsystem 808, and a domain-specific accelerator 810. During remote attestation, the security subsystem 802 (e.g., the remote attestation module) communicates an address range 878 of interest (or multiple address ranges of interest) to one or more write bitmaps 822 via the system interconnect 806. The write bitmaps 822 may be physically located within the SoC 800 such that they are coupled to address write channels 872 associated with various memories in the SoC 800.

In the illustrated example, the write bitmap 822-1 is located within a CPU subsystem 804 and is coupled to an address write channel 872-1 for the SRAM of the CPU subsystem 804, the write bitmap 822-2 is located within a memory subsystem 808 and is coupled to an address write channel 872-2 for the DRAM of the memory subsystem 808, and the write bitmap 822-3 is located within a domain-specific accelerator 810 and is coupled to an address write channel 872-3 for the SRAM of the domain-specific accelerator 810. Each of the write bitmaps 822 may extract a write address from the address write channels 872, determine whether the write address falls within the address range 878 (or within one of multiple address ranges of interest), and, if it is determined that the write address falls within the address range 878, update their internal bitmaps to modify the bits associated with the address range 878 to indicate so.

In various examples, the write bitmaps 822 may communicate the bitmaps statuses 880 to the security subsystem 802 via the system interconnect 806. Each bitmap status 880 may be sent either periodically, in response to a detected change in the bitmap, and/or in response to a request from the security subsystem 802 to receive the status. In some examples, the security subsystem 802 may send the address range 878 at a first time, and may thereafter begin to receive bitmap statuses from the write bitmaps 822 each time an extracted write address falls within the address range 878, such as a first bitmap status from the write bitmap 822-1 at a second time after the first time, and a second bitmap status from the write bitmap 822-2 at a third time after the second time.

Figure 9:
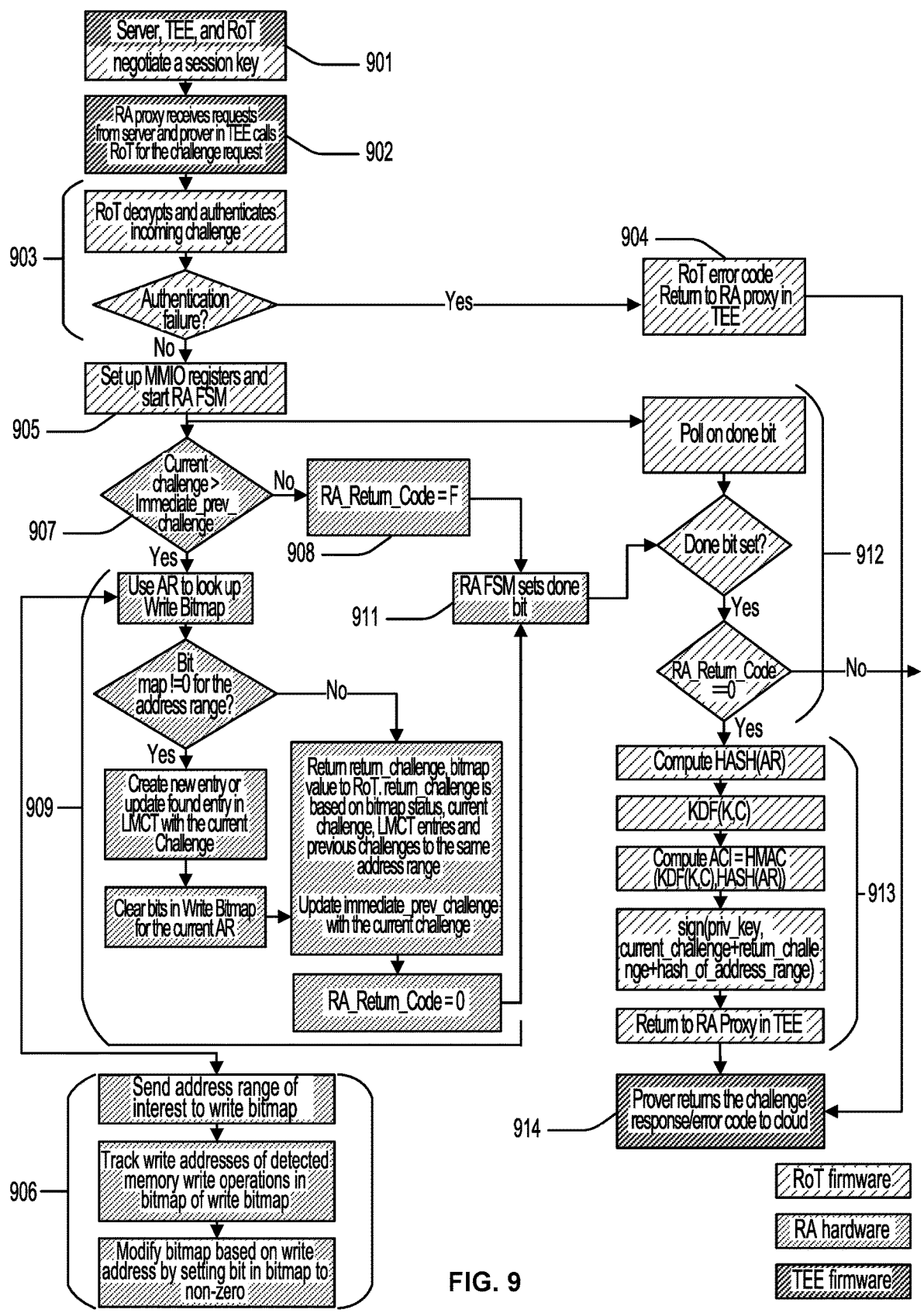
FIG. 9 illustrates various example steps of a method of performing remote attestation using a security subsystem of an integrated circuit device.

FIG. 9 illustrates various example steps of a method 900 of performing remote attestation using a security subsystem (e.g., security subsystems 102, 202, 802) of an integrated circuit device (e.g., SoCs 100, 200), in accordance with some embodiments of the present disclosure. As indicated in FIG. 9, steps of the method 900 may be performed by the RoT firmware (FW), the remote attestation (RA) hardware (e.g., the remote attestation module, the write bitmaps, etc.), and/or the TEE firmware. In some examples, the trusted software component executing on the CPU Subsystem is the TEE firmware and the software component executing on the security subsystem is the RoT firmware. In some examples, the remote attestation server is a secure server verifying the untrusted remote device (e.g., the SoC) before performing sensitive operations.

At step 901, the remote server, the TEE firmware, and the RoT firmware may negotiate a session key to avoid replay attacks. After this initial boot sequence step, the remote server may request for attestation at any time.

At step 902, the RA proxy executing on the CPU subsystem software may receive an attestation request from remote server. The prover in the TEE firmware may call the API in the RoT to process the challenge request.

At step 903, the RoT firmware may decrypt the challenge with a negotiated session key and authenticate the incoming challenge to verify the origin of the request.

At step 904, the RoT firmware may return an error response because of the authentication failure.

At step 905, the RoT firmware may set up the remote attestation module to process the attestation challenge.

At step 906, the security subsystem may send one or more address ranges of interest to the write bitmap. In some examples, by receiving the one or more address ranges of interest from the security subsystem, the write bitmap may be enabled to track all memory write operations to the one or more address ranges of interest. For example, the write bitmap may begin tracking all memory write operations to the one or more address ranges of interest or, in some examples, the write bitmap may continue tracking memory write operations to the one or more address ranges of interest and/or discontinue tracking memory write operations to addresses outside of the one or more address ranges of interest. The write bitmap may modify the bitmap based on the write address by, for example, setting a bit in the bitmap corresponding to the write address to non-zero.

At step 907, the remote attestation module may verify if a timestamp of the current incoming challenge is greater (e.g., later) than a timestamp of the immediate previous challenge. This allows the method 900 to avoid replay attacks of old challenges. The immediate previous challenge is the challenge that was sent by the server immediately prior to the current incoming challenge. If the timestamp of the current incoming challenge is indeed greater, the method 900 proceeds to step 909. Otherwise, the method 900 proceeds to step 908.

At step 908, the RA return code may return an error. The RA return code is the return code that is returned from the RA hardware to the RoT firmware. It may consist of success/error encoding, a challenge number looked up from LMCT, and/or a current challenge number. The RoT firmware will check the RA return code. If the RA return code is an error, the RoT firmware sends an error response to the server. If the RA return code is a pass code, the RoT firmware computes the signature of the requested address range, signs the signature with the device specific private key, and sends this to the server.

At step 909, the security subsystem may obtain a bitmap status from the write bitmap. The bitmap status may indicate that a write was detected within the one or more address ranges of interest. In some examples, the bitmap status may further indicate the time stamp associated with the write address being extracted. In some examples, the remote attestation module may query the bitmap status in the address range of interest. The remote attestation module may then look up the LMCT for any previous challenges to the same address range. If the bitmap status indicates that there were one or more writes detected to this address range, then the LMCT table is updated by creating a new entry or updating the previous entry with the same address range. If the bitmap status indicates there are no writes detected to this address range, then the LMCT is not updated. The RA hardware returns the RA error code to be 0 to indicate a pass status. The RA hardware registers may also be updated to store the immediate previous challenge, the challenge looked up from the LMCT, and the current challenge number.

At step 911, the remote attestation module may send the return response along with a timestamp to the RoT firmware.

At step 912, the RoT firmware may check the return code received from the remote attestation module.

At step 913, the RoT firmware may compute the attestation response which includes a signature of the contents of the challenged address range, along with the timestamp and the bitmap status encrypted with the session key.

At step 914, the prover in the TEE firmware may return the challenge response to the remote server.

Steps of the method 900 may be performed in any order and/or in parallel, and one or more steps of the method 900 may be optionally performed. One or more steps of the method 900 may be performed by one or more processors. The method 900 may be implemented as a computer-readable medium or computer program product comprising instructions which, when the program is executed by one or more processors, cause the one or more processors to carry out the steps of the method 900. One or more of the steps of the method 900 may be used in conjunction with the method described in FIG. 10. For example, one or more steps of the method described in FIG. 10 may be performed during step 906 of the method 900.

Figure 10:
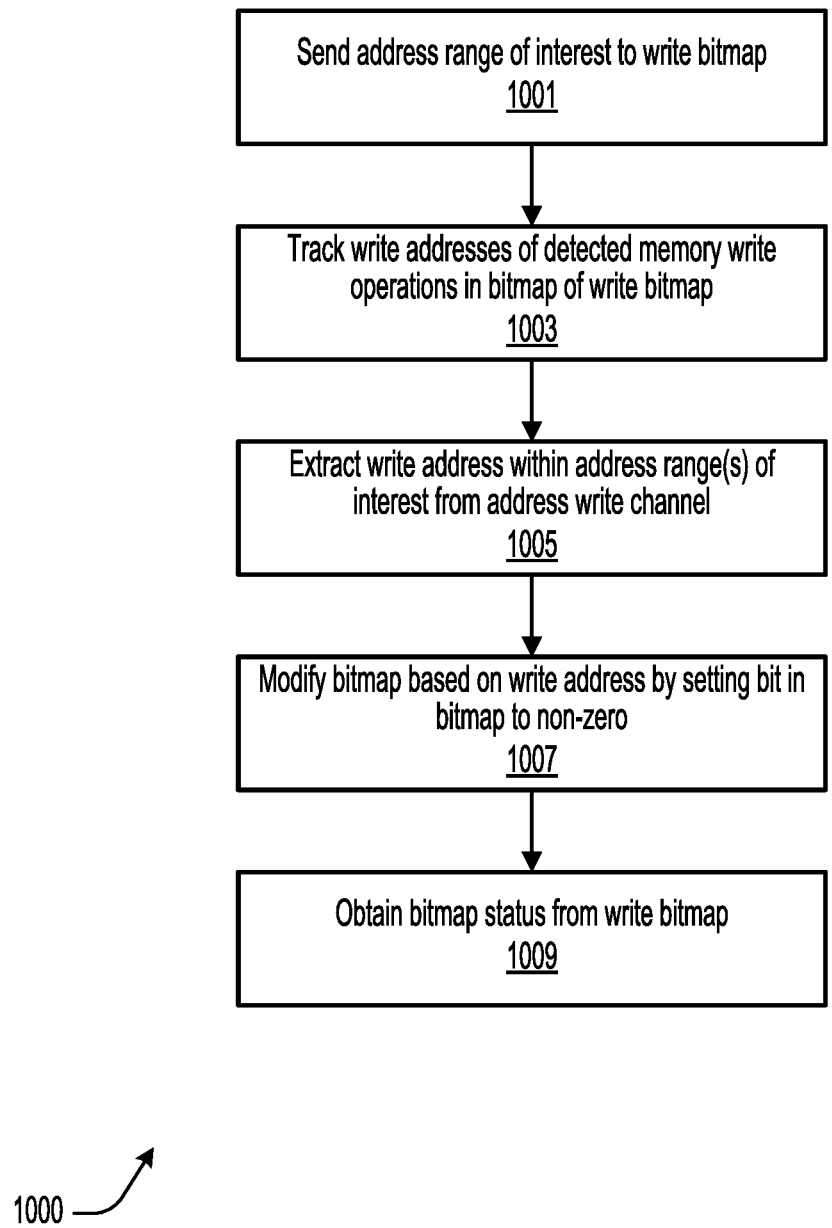
FIG. 10 illustrates a method of performing remote attestation using a security subsystem of an integrated circuit device.

FIG. 10 illustrates a method 1000 of performing remote attestation using a security subsystem (e.g., security subsystems 102, 202, 802) of an integrated circuit device (e.g., SoCs 100, 200), in accordance with some embodiments of the present disclosure. The integrated circuit device may also include a set of memories, a set of write bitmaps (e.g., write bitmaps 122, 622, 722, 822) that are respectively associated with the set of memories, a CPU subsystem (e.g., CPU subsystems 104, 204, 804), a memory subsystem (e.g., memory subsystem 108), and a system interconnect (e.g., system interconnects 106, 206, 606, 706, 806). Each of the set of write bitmaps may include a bitmap (e.g., bitmap 776) and a logic (e.g., sniff logic 770). The security subsystem may include a remote attestation module (e.g., remote attestation modules 130, 230, 630). In some examples, the method 1000 may be performed in response to receiving an attestation request from a requester.

At step 1001, the security subsystem may send one or more address ranges of interest (e.g., address ranges 678, 778, 878) to the write bitmap. The write bitmap may be one of the set of write bitmaps. In some examples, the one or more address ranges of interest may be specified in the attestation request, and may be referred to the challenged address range.

At step 1003, write addresses may be tracked in a bitmap of the write bitmap. The write addresses may be associated with detected memory write operations to a memory of the set of memories. The detected memory write operations may be to the one or more address ranges of interest. In some examples, by receiving the one or more address ranges of interest from the security subsystem, the write bitmap may be enabled to track all memory write operations to the one or more address ranges of interest. For example, the write bitmap may begin tracking all memory write operations to the one or more address ranges of interest or, in some examples, the write bitmap may continue tracking memory write operations to the one or more address ranges of interest and/or discontinue tracking memory write operations to addresses outside of the one or more address ranges of interest.

At step 1005, the write bitmap may extract a write address within the one or more address ranges of interest from an address write channel (e.g., address write channels 772, 872). The write address may be associated with a memory write operation to the memory. In some examples, the logic may be used to extract the write address from the address write channel.

At step 1007, the write bitmap may modify the bitmap based on the write address. The bitmap may be modified by setting a bit in the bitmap corresponding to the write address to non-zero. In some examples, the logic may be used to modify the bitmap based on the write address and to set the bit corresponding to the write address to non-zero.

At step 1009, the security subsystem may obtain a bitmap status (e.g., bitmap statuses 780, 880) from the write bitmap. The bitmap status may indicate that the write address within the one or more address ranges of interest was detected. In some examples, the security subsystem may maintain and update a data structure, referred to as a LMCT, based on the bitmap status. The data structure may further track a time stamp associated with the update using the bitmap status as well as previous updates (based on previous bitmap statuses) and previous time stamps. The security subsystem may use the data structure to prevent TOCTOU attacks.

In some examples, the security subsystem may receive the authentication request, either locally from the security subsystem or remotely from a remote server (e.g., cloud server), of the content of the one or more address ranges of interest. In response to receiving the authentication request, the security subsystem may compute a signature of the content of the one or more address ranges of interest using the bitmap status and/or the data structure. The security subsystem may return the computed signature to the requester (e.g., the security subsystem or the server). The security subsystem may further return an authentication code to the requester.

Optionally, in some examples, the security subsystem may generate an alarm signal (e.g., alarm signals 256) based on the bitmap status. In some examples, the alarm signal may indicate that the write address within the one or more address ranges of interest was detected. In some examples, the alarm may be used to notify the server that the write address within the one or more address ranges of interest was detected. In some examples, the alarm signal may indicate that an attack has been detected at the integrated circuit device.

Steps of the method 1000 may be performed in any order and/or in parallel, and one or more steps of method 1000 may be optionally performed. One or more steps of the method 1000 may be performed by one or more processors. The method 1000 may be implemented as a computer-readable medium or computer program product comprising instructions which, when the program is executed by one or more processors, cause the one or more processors to carry out the steps of the method 1000.

Figure 11:
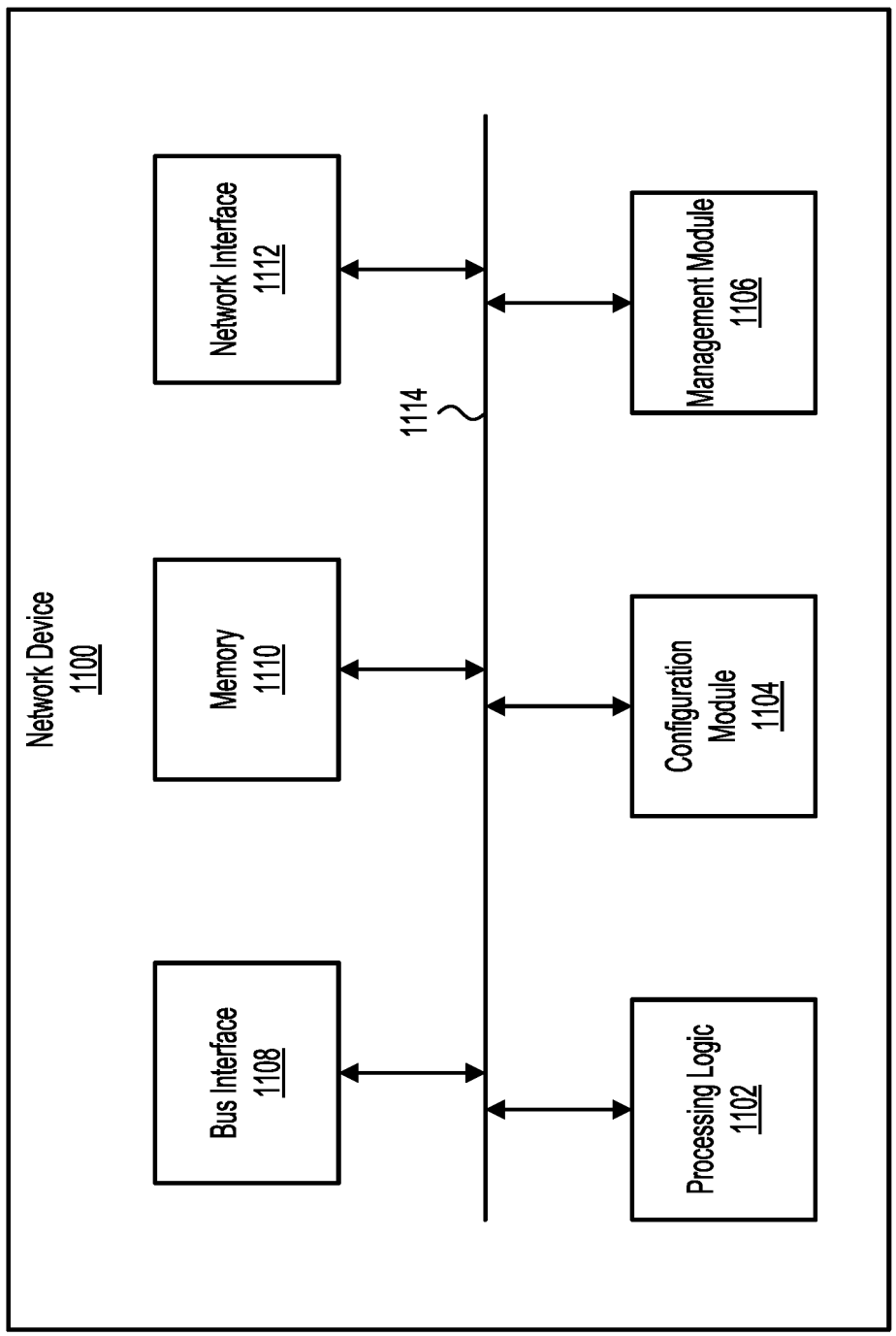
FIG. 11 illustrates an example of a network device.

FIG. 11 illustrates an example of a network device 1100. Functionality and/or several components of the network device 1100 may be used without limitation with other embodiments disclosed elsewhere in this disclosure, without limitations. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more buses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical, integer, and floating-point arithmetic. Examples of processors that may be used in the processing logic 1102 include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, Fiber Distributed Data Interface (FDDI), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
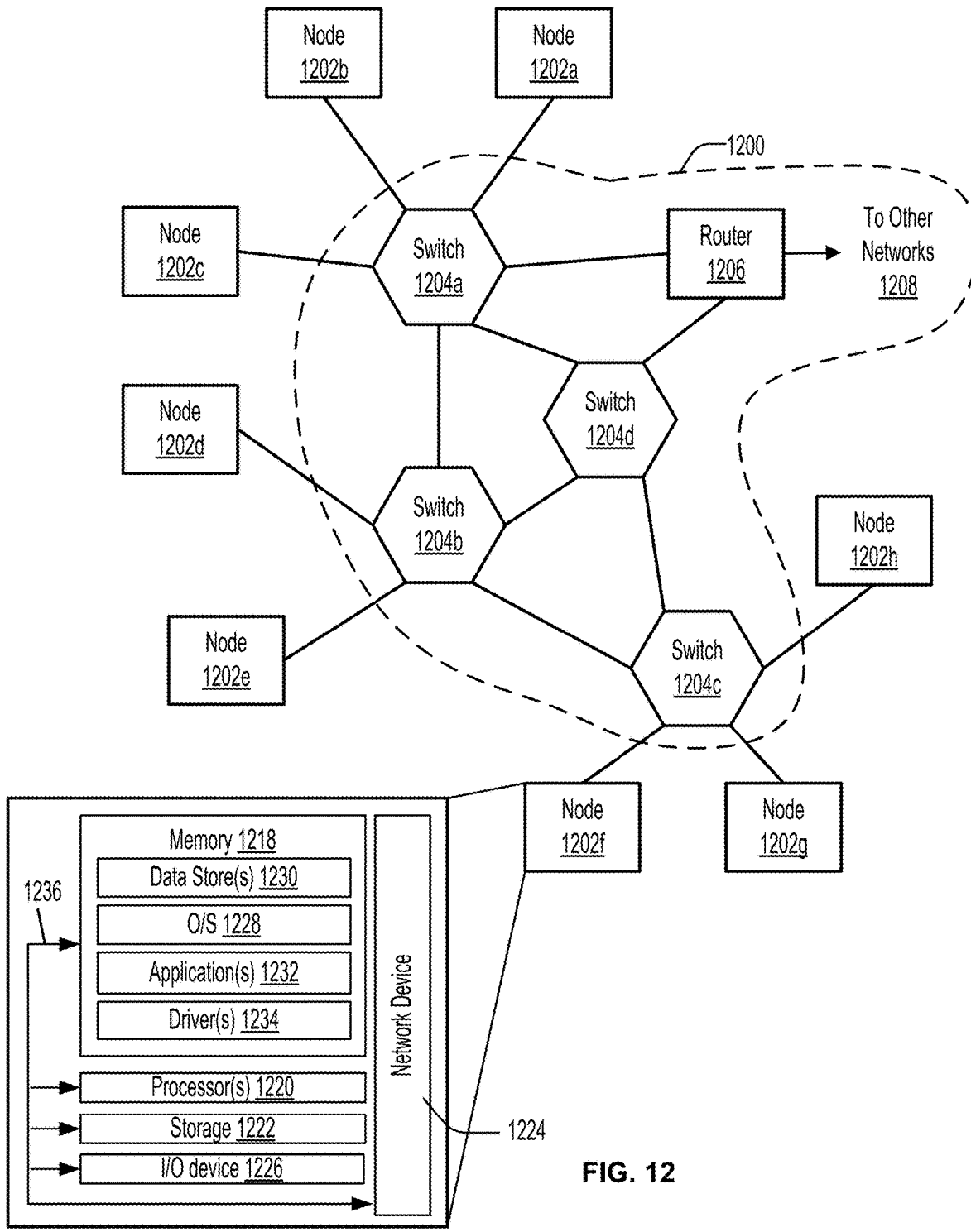
FIG. 12 illustrates an example architecture of one or more service provider computers and/or a user device connected via one or more networks.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. The network device(s) 1224 of FIG. 12 may include similar components discussed with reference to the network device 1100 of FIG. 11. In some implementations, the network device 1224 is a peripheral device, such as a PCI-based device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
a system interconnect;
a central processing unit (CPU) subsystem coupled to the system interconnect, the CPU subsystem comprising a set of CPU cores configured to execute instructions;
a set of trace blocks configured to extract a set of execution traces from the set of CPU cores, the set of execution traces indicating the instructions that have been executed by the set of CPU cores; and
a security subsystem coupled to the system interconnect, the security subsystem being separate from the CPU subsystem, the security subsystem comprising:
a rules block configured to store a set of rules; and
a set of verification cores configured to receive the set of execution traces from the set of trace blocks via a set of trace buses that extend between the set of trace blocks and the set of verification cores, the set of trace buses being separate from the system interconnect, wherein each of the set of verification cores is configured to:
receive an execution trace of the set of execution traces;
identify a control transfer instruction in the execution trace;
extract an address from the control transfer instruction, wherein the address is a destination address or a return address;
perform a check on the address by:
retrieving a rule of the set of rules from the rules block based on the control transfer instruction, the rule including an acceptable address range; and
determining that the address is not within the acceptable address range; and
generate an alarm signal based on the address not being within the acceptable address range.

2. The integrated circuit device of claim 1, wherein the control transfer instruction includes at least one of: a conditional branch instruction, an unconditional branch instruction, a direct branch instruction, an indirect branch instruction, a function call instruction, or a function return instruction.

3. The integrated circuit device of claim 1, wherein each of the set of verification cores is further configured to:
extract a context ID from the control transfer instruction, wherein the rule is retrieved from the rules block based on the context ID.

4. An integrated circuit device, comprising:
a central processing unit (CPU) subsystem comprising a processor core, the processor core configured to execute instructions;
a trace block configured to extract an execution trace from the processor core, the execution trace indicating the instructions that have been executed by the processor core;
a security subsystem comprising a verification core, the security subsystem being separate from the CPU subsystem, the verification core configured to:
receive the execution trace from the trace block;
extract an address from a control transfer instruction in the execution trace;
perform one or more checks on the address; and
generate a signal based on the one or more checks; and
a trace bus that extends between the CPU subsystem and the security subsystem, wherein the verification core is configured to receive the execution trace via the trace bus.

5. The integrated circuit device of claim 4, wherein the one or more checks include at least one of: a control flow analyzer check, a functional pointer integrity check, a function call return address check, a control flow integrity check, or an execution signature check.

6. The integrated circuit device of claim 4, wherein the control transfer instruction includes at least one of: a conditional branch instruction, an unconditional branch instruction, a direct branch instruction, an indirect branch instruction, a function call instruction, or a function return instruction.

7. The integrated circuit device of claim 4, wherein the verification core is further configured to:
identify the control transfer instruction in the execution trace.

8. The integrated circuit device of claim 4, wherein the verification core is further configured to:
retrieve a rule of a set of rules from a rules block based on the control transfer instruction, wherein the rule includes an acceptable address range.

9. The integrated circuit device of claim 8, wherein the verification core is further configured to:
extract a context ID from the control transfer instruction, wherein the rule is retrieved from the rules block based on the context ID.

10. The integrated circuit device of claim 8, wherein the signal is used to notify a server that the address is not within the acceptable address range, wherein the server is external to the integrated circuit device.

11. The integrated circuit device of claim 4, wherein the processor core is one of a set of processor cores, the trace block is one of a set of trace blocks, and the execution trace is one of a set of execution traces.

12. A computer-implemented method, comprising:
extracting an execution trace from a processor core of a central processing unit (CPU) subsystem, the execution trace indicating instructions that have been executed by the processor core;
receiving the execution trace at a verification core of a security subsystem, the security subsystem being separate from the CPU subsystem, wherein the execution trace is received by the verification core via a trace bus that extends between the CPU subsystem and the security subsystem;
extracting, at the verification core, an address from a control transfer instruction in the execution trace;
performing, at the verification core, one or more checks on the address; and
generating, at the verification core, an alarm signal based on the one or more checks.

13. The computer-implemented method of claim 12, wherein the one or more checks include at least one of: a control flow analyzer check, a functional pointer integrity check, a function call return address check, a control flow integrity check, or an execution signature check.

14. The computer-implemented method of claim 12, further comprising:
identifying, at the verification core, the control transfer instruction in the execution trace.

15. The computer-implemented method of claim 12, further comprising:

retrieving, at the verification core, a rule of a set of rules from a rules block based on the control transfer instruction, wherein the rule includes an acceptable address range.

16. The computer-implemented method of claim 15, further comprising:
extracting a context ID from the control transfer instruction, wherein the rule is retrieved from the rules block based on the context ID.

17. The computer-implemented method of claim 15, wherein the alarm signal is used to notify a server that the address is not within the acceptable address range.

18. The computer-implemented method of claim 12, wherein the processor core is one of a set of processor cores and the execution trace is one of a set of execution traces.

* * * * *